United States Patent [19]

Nakamura

[11] 4,309,315

[45] Jan. 5, 1982

[54] SURFACE-ACTIVATED FUNCTIONAL MATERIALS AND A METHOD OF PRODUCING THE SAME

[75] Inventor: Masashi Nakamura, Yokosuka, Japan

[73] Assignee: Nissan Motor Company, Ltd., Yokohama, Japan

[21] Appl. No.: 106,363

[22] Filed: Dec. 21, 1979

[30] Foreign Application Priority Data

Dec. 27, 1978 [JP] Japan ................................ 53-160018

[51] Int. Cl.$^3$ .......................... B01J 23/38; B01J 35/02
[52] U.S. Cl. .................................. 252/472; 252/425.3; 252/477 R; 204/32 R; 204/192 E; 204/192 EC
[58] Field of Search ................ 252/477 R, 425.3, 472; 204/32 R, 192 R, 192 C, 192 E, 192 EC; 427/318, 319

[56] References Cited

U.S. PATENT DOCUMENTS

| | | |
|---|---|---|
| 3,213,004 | 10/1965 | Schmidt ............................ 204/32 R |
| 3,957,692 | 5/1976 | Cairns et al. ........................ 252/465 |
| 3,993,595 | 11/1976 | Merkl . | |
| 4,006,268 | 2/1977 | Kennedy et al. ................ 204/192 E |
| 4,055,472 | 10/1977 | Freshcorn ......................... 204/32 R |
| 4,126,523 | 11/1978 | Wong ................................ 204/32 R |

FOREIGN PATENT DOCUMENTS

| | | |
|---|---|---|
| 252662 | 5/1963 | Australia . |
| 450179 | 4/1972 | Australia . |
| 44930 | 7/1972 | Australia . |
| 458879 | 10/1972 | Australia . |
| 465750 | 1/1973 | Australia . |
| 405902 | 2/1934 | United Kingdom . |
| 453803 | 9/1936 | United Kingdom . |
| 874516 | 8/1961 | United Kingdom . |
| 961878 | 6/1964 | United Kingdom . |
| 1014661 | 12/1965 | United Kingdom . |
| 1218237 | 1/1971 | United Kingdom . |
| 1322670 | 7/1973 | United Kingdom . |
| 1325945 | 8/1973 | United Kingdom . |
| 1378703 | 12/1974 | United Kingdom . |
| 1430516 | 3/1976 | United Kingdom . |
| 1459186 | 12/1976 | United Kingdom . |
| 1463447 | 2/1977 | United Kingdom . |
| 1472028 | 4/1977 | United Kingdom . |
| 1522535 | 8/1978 | United Kingdom . |
| 1527969 | 10/1978 | United Kingdom . |

OTHER PUBLICATIONS

Mattox, *Fundamentals of Ion Plating*, J. Vac. Sci. Technol, vol. 10, No. 1, pp. 47–52 (Jan./Feb. 1973).

Primary Examiner—W. J. Shine
Attorney, Agent, or Firm—Schwartz, Jeffery, Schwaab, Mack, Blumenthal & Koch

[57] ABSTRACT

A surface-activated functional material and a method of producing the same are disclosed. The surface-activated functional materials are produced by subjecting a surface of a metal substrate to an activation treatment to change an atomic configuration of the metal substrate into an activated state and then adsorbing a second metal element to the surface of the metal substrate to preserve the activated state.

32 Claims, 7 Drawing Figures

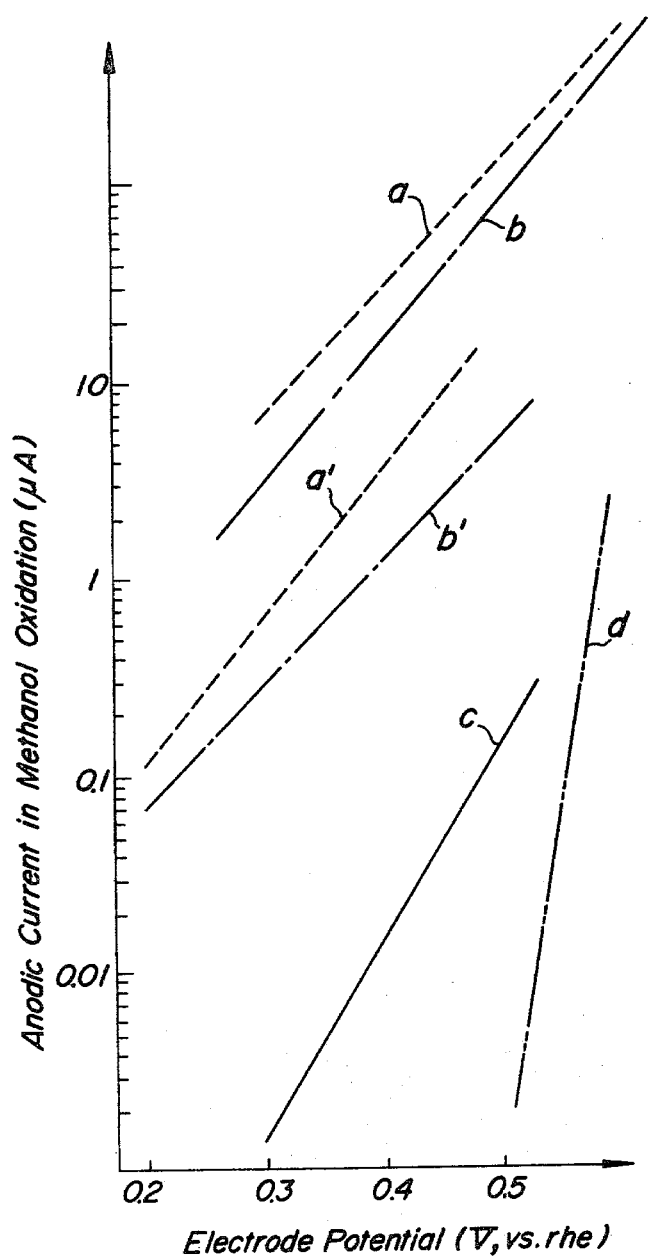

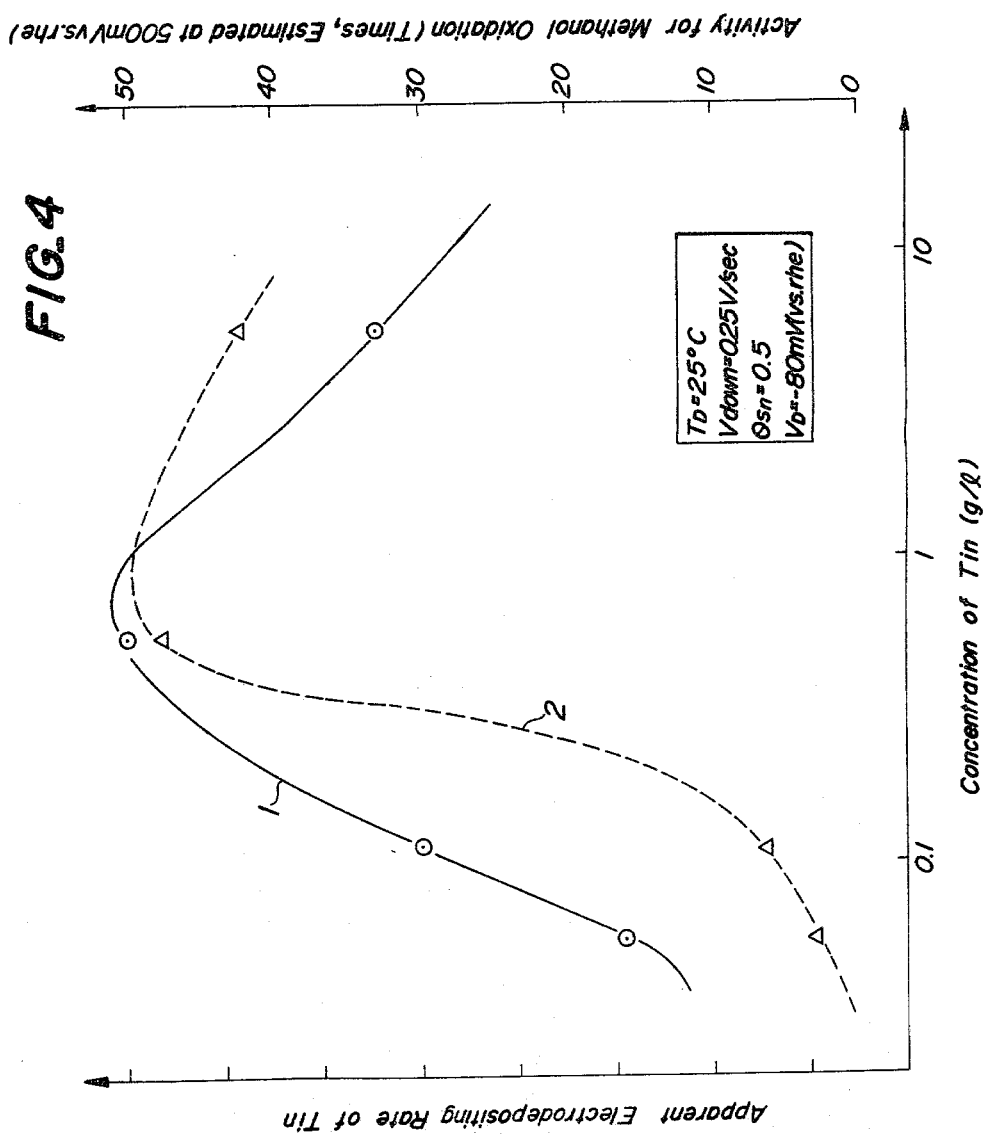

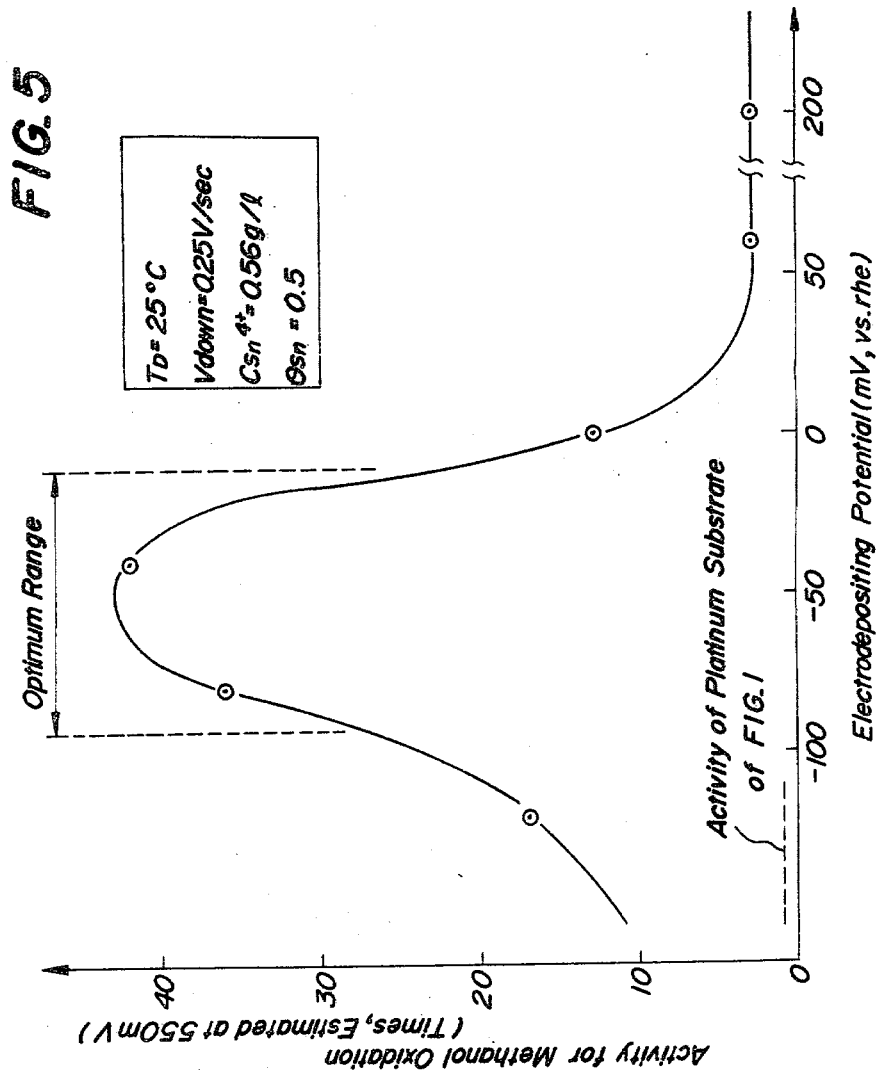

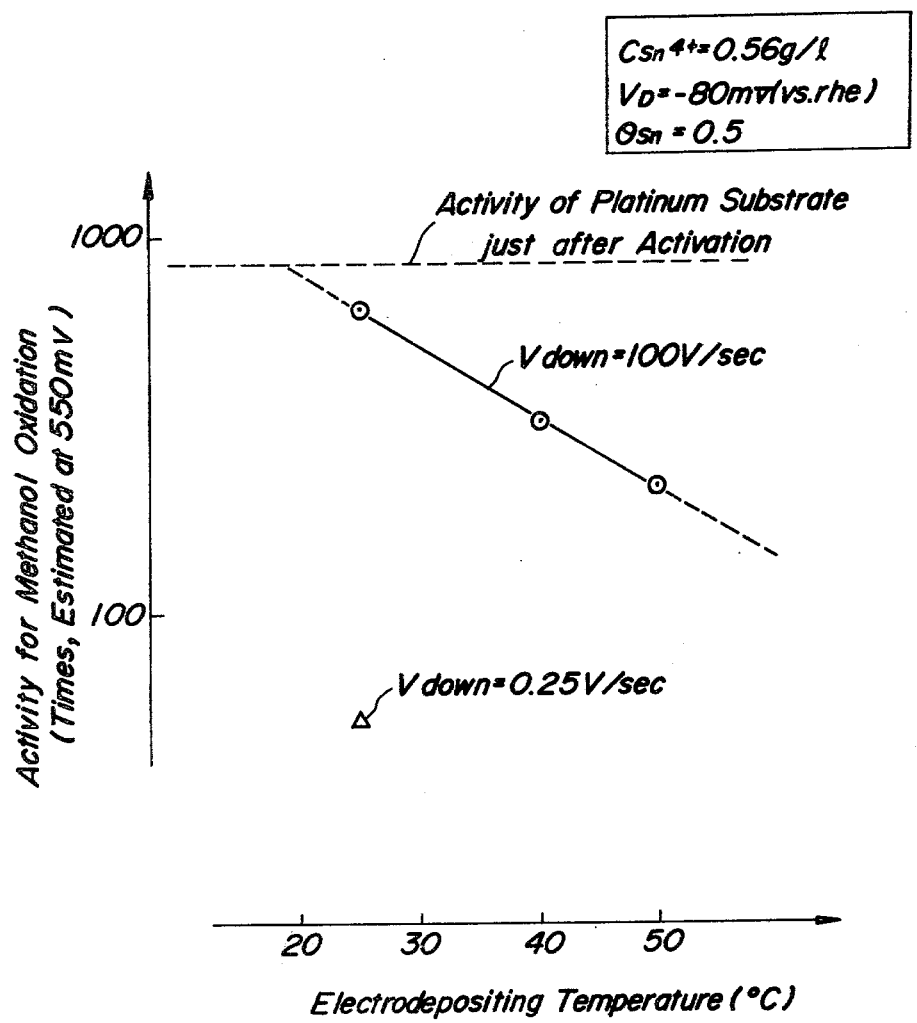

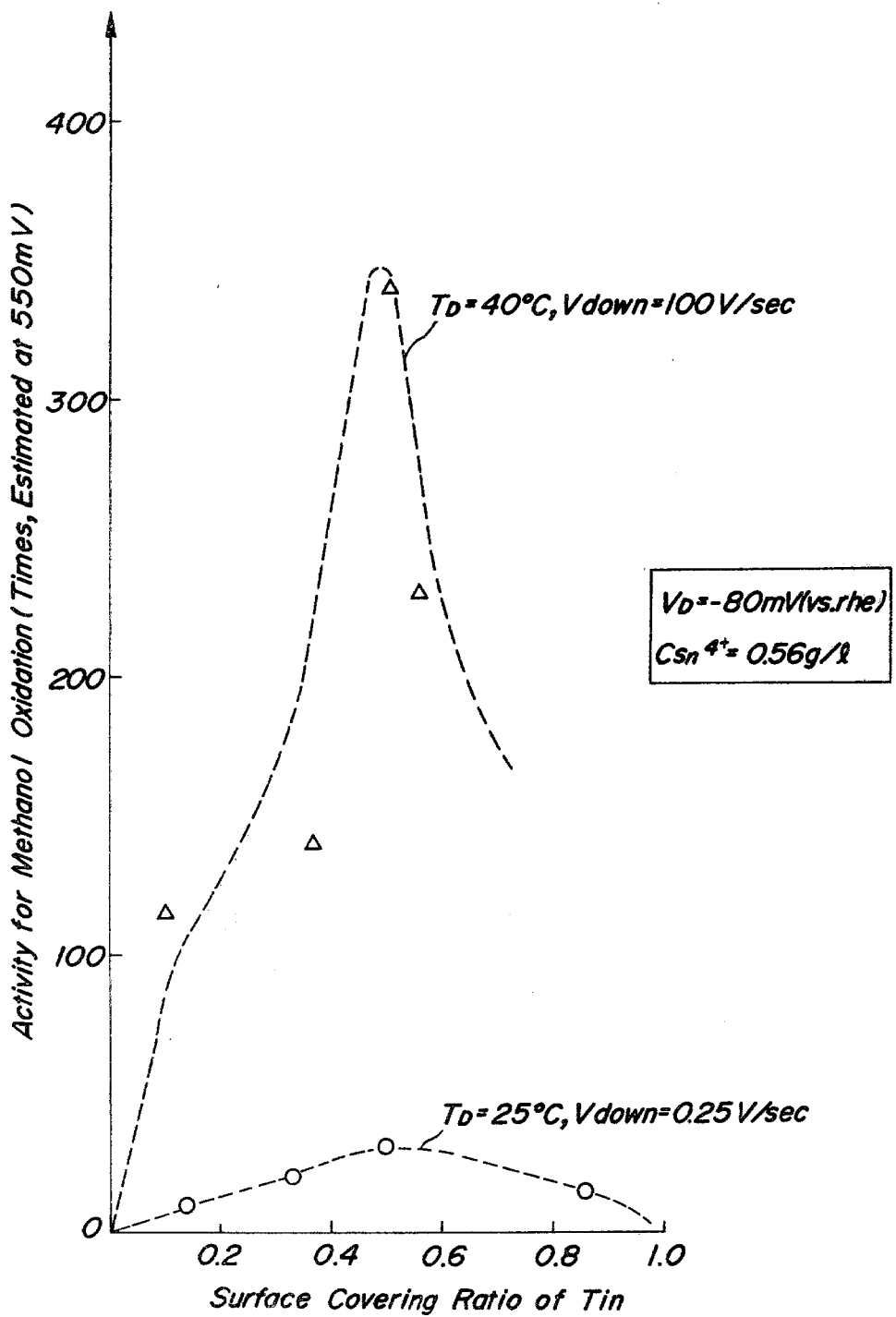

SURFACE-ACTIVATED FUNCTIONAL MATERIALS AND A METHOD OF PRODUCING THE SAME

BACKGROUND OF THE INVENTION

This invention relates to surface-activated functional materials, which are usable as a high activity catalyst in catalytic oxidation reaction of hydrocarbons, methanol, carbon monoxide or the like, a high active electrocatalyst for fuel cells, an active material for cells, electronic materials and so on, and a method of producing the same.

As the functional material of this type, the prior art will be described below with reference to an electrode of a fuel cell. In the fuel cells, the thermal efficiency is very excellent as compared with the other electricity generators and also most of fuels are in the form of fluid and can continuously be fed as an active substance. As a result, the improved electrode in the fuel cells make it possible to largely prolong the limit of cell life without consumption and wastage of the active substance. Lately, such fuel cells have fairly been of interest and some of which have been put to practical use in specific fields such as spacecrafts, military parts and the like. However, the development of the fuel cell can be said to be halfway due to restrictions on the material of electrode and the like.

In electric cars, lead-acid batteries usually used have such drawbacks that the running distance per one charging is short, the battery weight is large and the charging time is long. In order to solve these drawbacks, the use of fuel cells has long been practiced, but there are no fuel cells suitable for electric cars in view of economy of fuel, service system and the like. If it is intended to use a hydrogen-oxygen fuel cell, which has been first practiced for spacecrafts, as a fuel cell for electric car, there is a difficulty on the storage of hydrogen source through the cell itself has excellent performances, so that such hydrogen-oxygen fuel cell is unsuitable for electric cars regarding the total system of the energy use.

Now, it is expected to utilize a fuel cell wherein methanol is directly used as a fuel instead of hydrogen. In this case, however, performances of a catalyst constituting the electrode for fuel cell are poor and a great amount of noble metal is used as the electrode catalyst, so that it is difficult to use the methanol fuel cell in electric cars in view of economic reasons.

The methanol fuel cell has a high activation polarization. In order to further improve the performances of the cell, noble metals such as platinum and the like are used as most excellent electrode catalysts, but there is a problem that high activity can not be obtained due to a strong poisoning of methanol itself to the catalyst. That is, it has been reported in *Electrochimica Acta,* Vol. 12, pp 1323-1343 (1967) that the following reaction formula is a rate-determining step in the mechanism of methanol oxidation:

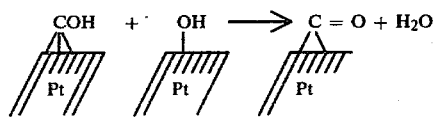

Therefore, in order to further elevate the activity for the above reaction, it has been estimated that an important key for the manufacture of the electrode catalyst is an enhancement a site adsorbing a hydroxyl group (OH$^-$). In accordance with this estimation, it has hitherto been attempted to improve the oxidation performance of the electrode catalyst by adhering a heavy metal capable of adsorbing a compound containing oxygen such as in a hydroxyl group and the like at a relatively low potential to a surface of a noble metal such as platinum or the like (Japanese Patent laid open No. 143,040/75 and British Pat. No. 1,106,708). However, the electrode catalysts produced by the above attempt have poor reproducibility and are not practical. Particularly, in the method of Japanese Patent laid open No. 143,040/75 wherein the heavy metal is adhered to the noble metal previously adsorbed with hydrogen, the catalytic performance is not improved, but rather deteriorates as compared with that of the catalyst composed only of the noble metal such as platinum or the like.

Furthermore, since the noble metal such as platinum or the like to be used as the electrode catalyst is very expensive, the cost of the resulting fuel cell becomes expensive.

SUMMARY OF THE INVENTION

Under the above circumstances, the invention is to overcome the above mentioned drawbacks of the prior art and to provide novel surface-activated functional materials, which are usable in the above mentioned electrode catalyst as well as high active oxidation catalysts for hydrocarbon, methanol, carbon monoxide or the like, active materials for cells, electronic materials and the like, and a method of producing the same. That is, the invention makes an attempt at the improvement of activation performance and the decrease of production cost in the functional material of this type and contributes to the advancement of various industries such as making fuel cells practical for electric cars and the like.

A first aspect of the invention lies in that when a surface of a functional material is subjected to an activation treatment, the atomic configuration in the surface layer of the functional material, which is usually in a geometrically stable and ground state, is forcibly changed into a particular excited atomic configuration having a very high activity for the above mentioned oxidation reaction. The activity of the functional material thus treated is 1,500-2,500 times (1 second after the activation) and 600-1,000 times (5 minutes after the activation) of that of the conventional platinum catalyst per one atom [at 0.3 V, versus a reversible hydrogen electrode (rhe)]. However, such an excited atomic configuration is very unstable and is rearranged into the originally stable state with a lapse of time and as a result, the activity value returns to the initial low value. Therefore, a second aspect of the invention lies in that another metal element is adsorbed as a reinforcement to the surface layer of the functional material immediately after the activation treatment within a time sufficient to keep the unstable excited atomic configuration so as to preserve the activated state. As a result, the activity of the surface-activated functional materials, particularly the electrode catalyst is kept at a value of about 2,000 times of that of the conventional electrode catalyst (at 0.3 V, vs. rhe) and the preservation of the activated state becomes stable over a long period of time.

BRIEF DESCRIPTION OF THE DRAWINGS

The invention will now be described in greater detail with reference to the accompanying drawings, wherein:

FIG. 3 is a polarization curve for an anodic oxidation of methanol on platinum electrode catalysts subjected to various surface treatments;

FIG. 4 is a graph showing an influence of a tin concentration on the anodic oxidation of methanol in the preservation of the activated state;

FIG. 5 is a graph showing an influence of an electrodepositing potential on the anodic oxidation of methanol in the preservation of the activated state;

FIG. 6 is a graph showing an influence of an electrodepositing temperature on the anodic oxidation of methanol in the preservation of the activated state; and FIG. 7 is a graph showing an influence of an adsorbed tin ratio on the anodic oxidation of methanol in the preservation of the activated state.

DETAILED DESCRIPTION OF PREFERRED EMBODIMENTS

Figure 1:
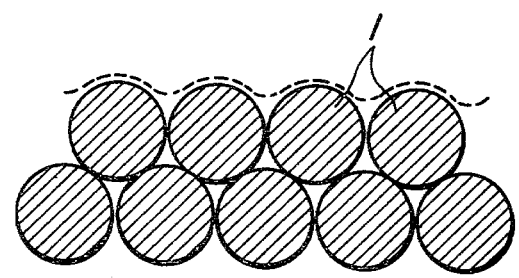
FIG. 1 is a partly enlarged schematic view showing the atomic configuration near a surface of a metal substrate with a stable ground state.

According to the invention, a metal substrate or functional material to be activated is a metal selected from noble metals such as platinum, gold and the like and transition metals such as tungsten, nickel and the like. Upon microscopical observation, these metal substrates have usually a surface of a ground state as shown in FIG. 1, wherein numeral 1 is an atom of the metal substrate and dotted lines represents an outer surface of the metal substrate. As apparent from FIG. 1, the atomic configuration of the metal substrate is geometrically stable.

According to the invention, the above metal substrate is subjected at its surface to an activation treatment by (1) an argon sputtering process, (2) an electrochemical anodic activation process, (3) a chemical redox process, or a combination thereof.

In the argon sputtering process, the metal substrate is first subjected to degassing by heating at a temperature of 300°–500° C. under an ultra high vacuum ($10^{-8}$–$10^{-10}$ Torr) for 3–5 hours. Thereafter, the sputtering is performed under an argon gas pressure of $10^{-6}$–$10^{-7}$ Torr in a short time to clean the surface of the metal substrate and at the same time to change the atomic configuration in the surface layer of the metal substrate into an activated or excited state. During the sputtering, the temperature of the metal substrate is kept within a range of 0°–150° C. When the temperature of the metal substrate is too high, the activated state of the atomic configuration rapidly returns to the originally stable state and as a result, the subsequent preservation of the activated state cannot be performed.

Alternatively, the surface activation of the metal substrate is carried out by the electrochemical anodic activation process wherein the potential of the metal substrate is alternately changed to positive and negative with respect to a potential of a reversible hydrogen electrode (hereinafter referred to as rhe) to conduct oxygen and hydrogen generations. According to the invention, the metal substrate is placed in an acidic aqueous solution of sulfuric acid, phosphoric acid, perchloric acid or the like with pH<2 at a liquid temperature of −20° C. to 120° C., during which the potential of the metal substrate is held at a value of more than 1.0 V with respect to rhe potential to effect the oxidation and subsequently dropped to less than 0.4 V to effect the reduction of oxides formed on the surface of the metal substrate. In this case, the oxidation time is 0.01 second to 1 minute, while the reduction time is not more than 2 minutes, preferably less than 10 seconds.

In the chemical redox process, the metal substrate is activated by exposing it alternately first to an oxygen atmosphere within 1 minute and then to a hydrogen atmosphere at a temperature of 300°–500° C. under a partial pressure of each atmosphere of 0.1–50 Torr and then repeating the exposure procedure at least one time.

All of the above three processes are effective for obtaining a highly excited atomic configuration and particularly, the electrochemical anodic activation process is most simple and effective.

Figure 2:
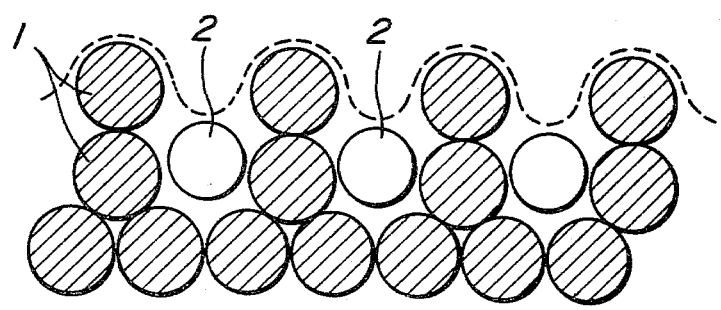
FIG. 2 is a partly enlarged schematic view showing the atomic configuration near the surface of the functional material according to the invention.

After the activation of the metal substrate, the excited atomic configuration is very unstable as it is and hence returns to the ground state as shown in FIG. 1 with a lapse of time. According to the invention, therefore, a reinforcement (hereinafter referred to as a second element) is adsorbed between the atoms near the surface of the metal substrate to form a surface layer as shown in FIG. 2, whereby the activated state of the metal substrate is preserved. That is, the second element atom 2 is adsorbed in a lattice hole defined by surface migration of atoms 1 of the metal substrate during the surface activation, resulting in the formation of the surface layer of the functional material consisting of an outermost layer composed only of the atoms 1 and a second layer composed of the atoms 1 and 2. Moreover, when a ratio of the atoms 1 present in the outermost layer to the atoms 2 present in the second layer is 1:1, the preservation of the activated state is maximum. Because, when a number of the second elements is deficient or the ratio of the atoms 1 to the atoms 2 is less than 1, the preservation of the activated state is insufficient, while when the ratio of the atoms 1 to the atoms 2 is more than 1, the activated state of the metal substrate is blocked by the second element and hence the activation effect lowers.

According to the invention, the second element is a heavy metal selected from tin, lead, arsenic, titanium and the like, which has the property of easily adsorbing or desorbing oxygen or hydroxyl group in the activation preserved state. Particularly, the second element is so selected that the atomic radius of the second element is equal to or smaller than that of the atom of the metal substrate.

The adsorption of the second element may be made by an electrodeposition process, an evaporation process, an ion implantation process or a chemical vapor deposition process. Among them, the electrodeposition process is most simple and sure in view of the controllability of the preservation. In these processes for the adsorption of the second element, it is important that the interval time between the completion of the activation treatment and the adsorption of the second element is within the range of 0–10 minutes and the time from the beginning of the adsorption to the completion thereof is within a range of 0.01 second to 10 minutes. When the temperature of the metal substrate is maintained at a predetermined value, if the interval time from the completion of the activation to the beginning of the adsorption becomes long, the rearrangement of the excited atomic configuration is caused to decrease the preservation effect, while if the adsorption time is long, the rearrangement of the excited atomic configuration can not sufficiently be controlled and hence the preservation effect decreases. Moreover, when the temperature of the metal substrate is lowered as far as possible, the rearranging rate of the excited atomic configuration becomes lower, so that the adsorption time can be made longer.

There will be described a first embodiment of the invention, wherein the metal substrate is subjected to a surface activation treatment by the electrochemical anodic activation process and thereafter the second element is adsorbed to and preserved in the activated surface of the metal substrate by the electrodeposition process.

At first, an electrodeposition bath is prepared by dissolving a salt or complex of a heavy metal or an organo-metallic compound containing a heavy metal or a high molecular weight compound containing a heavy metal as the second element in a sufficiently degassed aqueous solution of an acidic electrolyte with a pH<2 in such a manner that the concentration of the second element is mainly within a range of $10^{-2}$ g/l to $10^2$ g/l. In the electrodeposition bath, when the pH of the electrolyte is larger than 2, the heavy metal precipitates in the form of hydroxide and the preservation of the activated state cannot effectively be performed, so that the pH of the electrolyte should be smaller than 2. By limiting the concentration of the second element to the above defined range, a best result can be obtained. This is due to the fact that in order to achieve the preserved state of FIG. 2 in a short time after the activation of the metal substrate, it is necessary to make the electrodeposition rate large and hence the concentration of the second element should be made high, but when the concentration is too high, homogeneous adsorption may be obstructed.

As the electrodeposition conditions, the bath temperature is $-20°$ C. to $120°$ C. and the electrodepositing potential is 0.20 V to $-0.40$ V with respect to the rhe potential. Particularly, when tin is used as the heavy metal, the bath temperature should not be more than $80°$ C., because tin precipitates rapidly in the form of tin oxide at the bath temperature above $80°$ C.

However, it is difficult to obtain a better result by merely performing the electrodeposition under the above conditions. Now, it is essential to carry out the stopping of the electrodeposition under the following conditions.

That is, a blank current of the activated metal substrate (which is mainly a current $i_H$ in hydrogen electrode reaction) is first measured at a potential performing the electrodeposition in the aqueous solution of the acidic electrolyte containing no second element. Thereafter, the electrodeposition is carried out in the aqueous solution of the acidic electrolyte containing the second element and when a cathodic current (i) under the electrodeposition reaches 1/1.2–1/50 of $i_H$, the metal substrate adsorbed with the second element is taken out from the bath to stop the electrodeposition. By controlling the electrodeposition as mentioned above, the second element is easily adsorbed in less than monolayer to the activated surface of the metal substrate, whereby the activated state can be preserved.

Moreover, the condition for controlling the stopping of the electrodeposition may be given by the following formula:

$$\theta_M = \theta_H(V)\left(1 - \sqrt{i/i_H}\right) \quad (1)$$

wherein $\theta_M$ is a surface covering ratio of the second element, $\theta_H(V)$ is a surface covering ratio of hydrogen atom adsorbed on the metal substrate at a potential performing the electrodeposition in the aqueous solution of the acidic electrolyte containing no second element, which is given by $\theta_H(V) = \sqrt{i_H/i_S}$, $i_S$ is a saturated current of the activated metal substrate with respect to the hydrogen electrode reaction measured in the aqueous solution of acidic electrolyte containing no second element, $i_H$ is a current of the activated metal substrate with respect to the hydrogen electrode reaction measured at the potential performing the electrodeposition in the aqueous solution of the acidic electrolyte containing no second element, and i is a cathodic current at the stopping of the electrodeposition.

Therefore, it is obvious that when the value of $\theta_H(V)$ is previously determined by a potential sweep process or the like, the preserved state of FIG. 2 can easily be achieved according to the formula (1).

Particularly, the above mentioned controlling manner is effective when coating the functional material on an electrically conducting support having a large surface area by the method of the invention. Heretofore, the value of $\theta_M$ has directly been determined by measuring the amount of the second element adsorbed after anodic oxidation following to the coating, but in this case, it is necessary to destroy the resulting surface layer, so that the quality of functional material is unreliable. On the contrary, the controlling manner is a nondestructive inspection, so that the accurate estimation with respect to the functional material can be obtained and the reliability thereof is very high.

In order to further enhance the accuracy of the electrodeposited amount, the functional material is dipped in an acidic aqueous solution with a pH<2, which is thoroughly degassed with an inert gas, in a very short time (several seconds) immediately after it is taken out from the electrodeposition bath and then cleaned to remove the second element adsorbed to the metal substrate in the ionic state.

The thus obtained functional materials are very stable even when being stored in an acidic aqueous solution of pH<2 degassed with a hydrogen or inert gas or in an acidic aqueous solution containing methanol, hydrocarbon, carbon monoxide or the like and can preserve the higher activated state.

In FIG. 3 is shown the performance of the above functional material when using as an electrode catalyst for an anodic oxidation of methanol under various conditions.

In this figure, dotted lines a shows a result of the anodic oxidation of methanol with a platinum substrate after 1 second of the surface activation treatment and dotted lines a' shows a result of the anodic oxidation of methanol with a platinum substrate after 5 minutes of the surface activation treatment. Further, dot-dash lines b and b' show results of the anodic oxidation of methanol with the functional meterials according to the first embodiment of the invention after 24 hours of the electrodeposition, wherein tin as the second element is adsorbed to the platinum substrate after 1 second or 5 minutes of the surface activation treatment be electrodepositing in an aqueous solution of $SnCl_4.5H_2O_4$ at an electrodepositing potential of $-80$ mV so as to obtain $\theta_{Sn} \simeq 0.5$, respectively. A solid line c shows a result of the anodic oxidation of methanol with a platinum substrate after 24 hours of the surface activation treatment, and dotted dash lines d shows a result of the anodic oxidation of methanol with a material after 24 hours of the electrodeposition wherein a platinum substrate is subjected to the surface activation treatment and then reduced at a potential of 0 V (vs. rhe) to return the excited atomic configuration to the ground state and thereafter tin is adsorbed thereto at an electrodepositing potential of $-80$ mV so as to obtain $\theta_{Sn} = 0.5$.

As apparent from the comparison of the lines a and a' with the line c, the atomic configuration of the platinum substrate is rearranged from the excited state to the originally ground state in 24 hours after the mere activation treatment, so that the performance of the substrate considerably lowers. On the other hand, the functional material according to the first embodiment of the invention exhibit the performance of the platinum substrate just after the activation or the performance near the line a or a' even after 24 hours of the electrodeposition, from which it is apparent that the functional material according to the present invention preserves the activated state of the platinum substrate. Moreover, it is obvious from the line d that when the second element is adsorbed to the platinum substrate rearranged in the originally ground state, the performance at the activated state cannot be maintained and conversely, the second element acts as a poisoning substance.

In the fuel cell, a range of 0–0.3 V is important as a working potential. In this connection, it is apparent that the performance of the functional material (the line b') is improved by 200–300 times of the conventional material (the line c).

Then, there will be described a second embodiment of the invention. In this case, a platinum substrate is subjected to an electrochemical anodic activation wherein the substrate is oxidized in an aqueous solution of an acidic electrolyte with a pH<2 containing tin as a second element at a temperature below 80° C. at a potential of more than 1.0 V with respect to rhe potential and then reduced at a potential of less than 0.4 V with respect to rhe potential, and subsequently the second element is adsorbed to the activated surface of the substrate at the same latter potential by the electrodeposition as described above. In this way, the platinum substrate can be preserved by the second element at a maximum activated state, the performance of which being close to that of the substrate just after the activation. That is, as shown in FIG. 3, the line b comes close to the line a and is improved by about 2,000 times of the line c (at 0.3 V). The activity of this functional material is substantially consistent with that of the platinum substrate after 1 second of the activation.

The optimum preservation conditions in the platinum-tin system will be described below.

When the platinum substrate is activated by the electrochemical anodic activation process and then left to stand as it is, the excited atomic configuration returns to the originally ground state (as shown in FIG. 1) at a rearranging rate $V_2$. Therefore, it is fundamentally important that tin is adsorbed to the surface of the platinum substrate just after the activation by the electrodeposition process at an electrodepositing rate $V_1$ as fast as possible (i.e. $V_1$ is made larger than $V_2$ as far as possible). That is, the preservation conditions for the activated state of the platinum substrate or the electrodeposition conditions of tin are summarized in the following table in connection with $V_1$ and $V_2$.

|  | $V_1$ | $V_2$ |
|---|---|---|
| Concentration of tin ($C_{Sn^{4+}}$, g/l) | o | x |
| Electrodepositing potential ($V_D$, mV, rhe) | o | x |
| Electrodepositing temperature ($T_D$, °C.) | o | o |
| Rate for dropping the potential after the oxidation of platinum substrate up to less than 0.4 V or surface reduction rate ($V_{down}$, V/sec) | o | o |

Note:
Symbol o shows to have a relation between the both cases, while symbol x represents no relation.

The activity of the platinum-tin functional material for the anodic oxidation of methanol is closely related to the concentration of tin present in the electrodeposition bath as seen from a curve 1 of FIG. 4. While, the concentration of tin has a relation to an apparent electrodepositing rate of tin ($V_{obs}$) as shown by a curve 2 of FIG. 4, which is a function of $V_1$. When comparing the curve 1 with the curve 2, it is understood that the apparent electrodepositing rate of tin is well interrelated to the activity of the functional material for the anodic oxidation of methanol. That is, it is apparent from FIG. 4 that the larger the value of $V_{obs}$, the higher the activity in the preserved state.

The adsorbed state of tin or the preserved activity for the anodic oxidation of methanol depends upon the electrodepositing potential ($V_D$) as shown in FIG. 5 even when the surface covering ratio of tin is given by $\theta_{Sn} = 0.5$. As apparent from FIG. 5, the optimum electrodepositing potential is within a range of $-20$ mV to $-90$ mV.

When the adsorbed state of tin is analyzed by the potential sweep process or the like, if $V_D$ is larger than 0 mV, tin atom is hardly adsorbed in the lattice hole defined by surface migration of platinum atoms, but is adsorbed on the outermost layer composed of the migrated platinum atoms. As a result, the excited atomic configuration of the platinum substrate returns to the originally ground state without being preserved in the state shown in FIG. 2. While, if $V_D$ is more negative than $-100$ mV, hydrogen gas violently generates in the lattice hole and hence the tin ion hardly approaches the lattice hole.

FIG. 6 shows an effect of the electrodepositing temperature ($T_D$) on the preserved activity when the conditions of the surface activation for the platinum substrate, particularly the surface reduction rate ($V_{down}$) after the oxidation are made constant, from which it is apparent that the lower the electrodepositing temperature $T_D$, the higher the preserved activity. This shows that the rearranging rate $V_2$ of the platinum atom is more sensitive to the electrodepositing temperature $T_D$ as compared with the electrodepositing rate $V_2$ of the tin ion. On the other hand, it has been confirmed from various experimental results that the activation energy to each of $V_1$ and $V_2$ is 40–50 Kcal/mole and 10–15 Kcal/mole, respectively, which values being well coincident with the result of FIG. 6.

FIG. 7 shows influences of the surface covering ratio $\theta_{Sn}$ and electrodepositing temperature $T_D$ on the preserved activity, from which it is apparent that the maximum preserved activity is obtained at $\theta_{Sn}=0.5$, i.e. when a ratio of platinum atoms present in the outermost layer and tin atoms present in the second layer is 1:1 independently of $T_D$. In opposition to the result of FIG. 6, the preserved activity at $T_D=40°$ C. is higher than that at $T_D=25°$ C. in FIG. 7, which is based on the difference of $V_{down}$. In the same electrodepositing temperature, the larger the $V_{down}$, the higher the activity as apparent from FIG. 6.

From the results of FIGS. 6 and 7, it can be seen that two control factors $T_D$ and $V_{down}$ are closely interrelated to each other. Therefore, the appropriate combination of these two factors is most important to control the electrodeposition for obtaining a best result.

There will be described a third embodiment of the invention, wherein gold is used as the metal substrate instead of platinum. In this case, the same procedure as described in the second embodiment was repeated. As a result, the optimum oxidation potential of the electrochemical anodic activation was 1.8–2.1 V (vs. rhe) and the activity of the activated gold for the anodic oxidation of methanol was improved by about 30–50 times of that of the nonactivated gold. When the activated state of gold is preserved with tin, the preserved activity is obtained like the case of platinum-tin system.

Moreover, a similar result is obtained when using lead as the metal substrate.

There will be described a fourth embodiment of the invention, wherein a noble metal supported on a carrier such as alumina, tin oxide or the like is used as a metal substrate to be activated.

The noble metal is subjected to a surface activation treatment by any one of the above mentioned activation processes and then a second element is adsorbed to the activated surface of the noble metal by any one of the above mentioned adsorption processes. When the thus obtained functional material is used as a catalyst for the purification of exhaust gas, the performance is improved by about ten times over the usually used catalysts. Moreover, the amount of expensive noble metal used can largely be decreased.

As mentioned above, the functional materials according to the invention have an activity of about 2,000 times of the conventional ones. Particularly, the performance of the functional material as an electrode catalyst is considerably superior to that of the conventionally practised hydrogen-oxygen fuel cells. Further, the amount of expensive elements such as noble metals and the like used can largely be decreased as compared with the case of conventionally used fuel cells, so that the production cost of the electrode catalyst can considerably be reduced. As a result, the practicalization of fuel cells as a power source for electric cars and the like can be achieved by using the functional material according to the invention. Moreover, the functional materials according to the invention possess both selectivity and the high activity, so that they are widely applicable in the fields requiring a surface treatment such as catalyst, cell material, electronic material and the like as well as the fuel cell material.

What is claimed is:

1. A surface-activated functional material comprising a substrate of a metal exhibiting catalytic properties when activated, the atomic configuration of which is activated by excitation, and a second metal element adsorbed to the surface of said metal substrate so as to preserve the activated state of said metal substrate; the surface of said metal substrate consisting of an outermost layer composed only of atoms of said metal substrate, said outermost layer having lattice holes, and a second layer beneath said outermost layer composed of atoms of said metal substrate and atoms of said second metal element adsorbed in lattice holes defined by surface migration of atoms of said metal substrate during the excitation such that less than one monolayer of said second metal is adsorbed to the surface of said substrate.

2. A surface-activated functional material as claimed in claim 1, wherein said metal substrate is a noble metal or a transition metal.

3. A surface-activated functional material as claimed in claim 1, wherein said second metal element is a heavy metal.

4. A surface-activated functional material as claimed in claim 1, wherein the ratio of atoms of said metal substrate present in the outermost layer to atoms of said second metal element present in the second layer is about 1:1.

5. A method of producing surface-activated functional materials, which comprises subjecting a surface of a metal substrate to an activation treatment to excite the atomic configuraton of said surface of said metal substrate into an activated state, and then adsorbing a second metal element to the surface of said metal substrate while said atomic configuration remains excited, less than one monolayer of said second metal being adsorbed to the surface of said substrate to preserve said activated state.

6. A method as claimed in claim 5, wherein said metal substrate is a noble metal or a transition metal.

7. A method as claimed in claim 5, wherein said second metal element is a heavy metal.

8. A method as claimed in claim 5, wherein said substrate exhibits catalytic properties when activated.

9. A method as claimed in claim 5 or 8, wherein said activation treatment is carried out by an argon sputtering process, an electrochemical anodic activation process, a chemical redox process or a combination thereof.

10. A method as claimed in claim 9, wherein said electrochemical anodic activation process is performed by holding the potential of said metal substrate at a value of more than 1.0 V with respect to the potential of a reversible hydrogen electrode in an aqueous electrolyte solution to effect oxidation and subsequently dropping said potential of the metal substrate to a value of less than 0.4 V to effect reduction.

11. A method as claimed in claim 10, wherein the time for said oxidation is from 0.01 second to 1 minute and the time for said reduction is not more than 2 minutes.

12. A method as claimed in claim 10, wherein said aqueous electrolyte solution is acidic.

13. A method as claimed in claim 12, wherein said aqueous electrolyte solution has a pH<2.

14. A method as claimed in claim 10, wherein said aqueous electrolyte solution is maintained at a temperature of from $-20°$ C. to 120° C.

15. A method as claimed in claim 9, wherein said argon sputtering process is performed by subjecting said metal substrate to a pretreatment for degassing and then sputtering under an argon gas pressure of $10^{-6}$ to $10^{-7}$ Torr to activate the surface of said metal substrate.

16. A method as claimed in claim 15, wherein said pretreatment is carried out by heating said metal substrate at a temperature of 300° C. to 500° C. under a vacuum of $10^{-8}$ to $10^{-10}$ Torr.

17. A method as claimed in claim 15, wherein said metal substrate is maintained at a temperature of from 0° C. to 150° C. during the sputtering.

18. A method as claimed in claim 9, wherein said chemical redox process is performed by alternately exposing said metal substrate to first an oxygen atomsphere and then within one minute to a hydrogen atmosphere, each atmosphere having a predetermined partial pressure at a predetermined heating temperature, and repeating the exposure procedure at least one time to activate the surface of said metal substrate.

19. A method as claimed in claim 18, wherein said heating temperature is 300° to 500° C.

20. A method as claimed in claim 18, wherein said partial pressure of each of oxygen and hydrogen atmospheres is 0.1 to 50 Torr.

21. A method as claimed in claim 5, wherein the interval time between the completion of the activation and the beginning of the adsorption is not more than 10 minutes.

22. A method as claimed in claim 5, wherein the adsorption of said second metal element is carried out by any one of electrodeposition process, evaporation process, ion implantation process and chemical vapor deposition process.

23. A method as claimed in claim 22, wherein said electrodeposition process is performed by electrodepositing a heavy metal as said second metal element in an electrodeposition bath composed of an aqueous solution of an acidic electrolyte containing any one of heavy metal salts, heavy metal complexes, heavy metal-containing organometallic compounds and heavy metal-containing high molecular weight compounds.

24. A method as claimed in claim 23, wherein said electrodeposition bath contains said second metal element of $10^{-2}$ g/l to $10^2$ g/l.

25. A method as claimed in claim 23, wherein said electrodeposition bath is maintained at a temperature of $-20°$ to 120° C.

26. A method as claimed in claim 23, wherein said electrodeposition is carried out at an electrodepositing potential of 0.20 V to $-0.40$ V with respect to a potential of a reversible hydrogen electrode.

27. A method as claimed in claim 23, wherein said electrodeposition is stopped when the value of the cathodic electrodeposition current reaches 1/1.2–1/50 of a blank current.

28. A method as claimed in claim 5, wherein said adsorption of the second metal element is stopped at a time of 0.01 second to 10 minutes after the beginning of said adsorption.

29. A method as claimed in claim 5, wherein said functional material after the adsorption of the second metal element is cleaned with an aqueous electrolyte solution.

30. A method as claimed in claim 29, wherein said aqueous electrolyte solution has a pH $<2$.

31. A method as claimed in claim 5, wherein said surface of the metal substrate is subjected to an activation treatment by an electrochemical anodic activation process in an aqueous electrolyte solution containing said second metal element and then said second metal element is adsorbed by an electrodeposition at a potential of 0.2 V to $-0.40$ V with respect to a potential of a reversible hydrogen electrode in the same aqueous electrolyte solution.

32. The product of the method as claimed in claim 8.

* * * * *